US008565041B2

(12) United States Patent
Ruet

(10) Patent No.: US 8,565,041 B2
(45) Date of Patent: Oct. 22, 2013

(54) ACQUISITION SCHEME FOR VIBROSEIS MARINE SOURCES

(71) Applicant: Cggveritas Services SA, Massy Cedex (FR)

(72) Inventor: Laurent Ruet, Massy (FR)

(73) Assignee: Cggveritas Services SA, Massy Cedex (FR)

( * ) Notice: Subject to any disclaimer, the term of this patent is extended or adjusted under 35 U.S.C. 154(b) by 0 days.

(21) Appl. No.: 13/687,059

(22) Filed: Nov. 28, 2012

(65) Prior Publication Data

US 2013/0100765 A1     Apr. 25, 2013

Related U.S. Application Data

(63) Continuation of application No. 13/415,225, filed on Mar. 8, 2012.

(30) Foreign Application Priority Data

Oct. 19, 2011     (FR) ...................................... 11 59433

(51) Int. Cl.
G01V 1/38     (2006.01)
G01V 1/00     (2006.01)

(52) U.S. Cl.
CPC ..... *G01V 1/38* (2013.01); *G01V 1/005* (2013.01); *G01V 1/3808* (2013.01)
USPC ............................................. 367/23; 367/15

(58) Field of Classification Search
USPC .................................................... 367/15–24
See application file for complete search history.

(56) References Cited

U.S. PATENT DOCUMENTS

| | | |
|---|---|---|
| 3,288,243 A | 11/1966 | Silverman |
| 3,331,050 A | 7/1967 | Kilmer et al. |
| 3,691,516 A | 9/1972 | Graham et al. |
| 3,885,225 A | 5/1975 | Anstey et al. |
| 4,030,063 A | 6/1977 | Wallen |
| 4,069,470 A | 1/1978 | Cunningham et al. |
| 4,159,463 A | 6/1979 | Silverman |
| 4,168,485 A | 9/1979 | Payton et al. |
| 4,188,610 A | 2/1980 | Nelson |
| 4,272,226 A | 6/1981 | Osborne |
| 4,295,213 A | 10/1981 | Mifsud |

(Continued)

FOREIGN PATENT DOCUMENTS

| | | |
|---|---|---|
| EP | 2 267 486 A2 | 12/2010 |
| GB | 2 183 834 A | 6/1987 |

(Continued)

OTHER PUBLICATIONS

Great Britain Search Report in corresponding Great Britain Application No. 1215264.1 dated Dec. 5, 2012.

(Continued)

*Primary Examiner* — Krystine Breier
(74) *Attorney, Agent, or Firm* — Patent Portfolio Builders, PLLC

(57) ABSTRACT

Control mechanisms, computer software and methods for driving vibrational source arrays underwater. An incoherent acquisition scheme drives individual source elements simultaneously and incoherently while a coherent acquisition scheme drives high-frequency individual source elements simultaneously and incoherently and low-frequency individual source elements simultaneously and coherently. Thus, denser coverage and an increased energy input is achieved for the source arrays.

20 Claims, 12 Drawing Sheets

(56) References Cited

U.S. PATENT DOCUMENTS

| | | | |
|---|---|---|---|
| 4,391,299 | A | 7/1983 | Holmes |
| 4,441,174 | A | 4/1984 | Ray et al. |
| 4,514,834 | A | 4/1985 | Hanson et al. |
| 4,556,963 | A | 12/1985 | Hugus et al. |
| 4,636,956 | A | 1/1987 | Vannier et al. |
| 4,715,020 | A | 12/1987 | Landrum, Jr. |
| 4,799,201 | A | 1/1989 | Nelson |
| 4,823,326 | A | 4/1989 | Ward |
| 4,885,726 | A | 12/1989 | Myers |
| 4,953,657 | A | 9/1990 | Edington |
| 4,969,129 | A | 11/1990 | Currie |
| 4,982,374 | A | 1/1991 | Edington et al. |
| 5,062,089 | A | 10/1991 | Willard et al. |
| 5,128,900 | A | 7/1992 | Cole |
| 5,199,005 | A | 3/1993 | Forsberg |
| 5,410,517 | A | 4/1995 | Andersen |
| 5,426,618 | A | 6/1995 | Chen et al. |
| 5,703,833 | A | 12/1997 | Allen |
| 5,719,821 | A | 2/1998 | Sallas et al. |
| 5,721,710 | A | 2/1998 | Sallas et al. |
| 5,901,112 | A | 5/1999 | Walker |
| 5,959,939 | A | 9/1999 | Tengham et al. |
| 6,028,818 | A | 2/2000 | Jeffryes |
| 6,049,507 | A | 4/2000 | Allen |
| 6,076,629 | A | 6/2000 | Tengham |
| 6,076,630 | A * | 6/2000 | Ambs ............ 181/110 |
| 6,161,076 | A | 12/2000 | Barr et al. |
| 6,181,646 | B1 | 1/2001 | Bouroucos et al. |
| 6,253,156 | B1 | 6/2001 | Bui-Tran et al. |
| 6,327,537 | B1 | 12/2001 | Ikelle |
| 6,366,857 | B1 | 4/2002 | Bird et al. |
| 6,370,477 | B1 | 4/2002 | Vermeer |
| 6,464,035 | B1 | 10/2002 | Chelminski |
| 6,545,944 | B2 | 4/2003 | de Kok |
| 6,597,632 | B2 | 7/2003 | Khan |
| 6,606,958 | B1 | 8/2003 | Bouyoucos |
| 6,664,788 | B2 | 12/2003 | Hornbostel et al. |
| 6,687,619 | B2 | 2/2004 | Moerig et al. |
| 6,704,245 | B2 | 3/2004 | Becquey |
| 6,714,867 | B2 | 3/2004 | Meunier |
| 6,754,590 | B1 | 6/2004 | Moldoveanu |
| 6,766,256 | B2 | 7/2004 | Jeffryes |
| 6,807,508 | B2 | 10/2004 | Becquey |
| 6,842,701 | B2 | 1/2005 | Moerig et al. |
| 6,942,059 | B2 * | 9/2005 | Smith ............ 181/110 |
| 7,257,049 | B1 | 8/2007 | Laws et al. |
| 7,327,633 | B2 | 2/2008 | Bagaini et al. |
| 7,515,505 | B2 | 4/2009 | Krohn et al. |
| 7,551,518 | B1 | 6/2009 | Tenghamn |
| 7,859,945 | B2 | 12/2010 | Sallas et al. |
| 7,881,160 | B2 | 2/2011 | Rouquette |
| 7,974,152 | B2 | 7/2011 | Tenghamn |
| 8,271,173 | B2 | 9/2012 | Wilmanowicz et al. |
| 8,339,896 | B2 | 12/2012 | van Borselen et al. |
| 2003/0176974 | A1 | 9/2003 | Baliguet et al. |
| 2004/0089499 | A1 | 5/2004 | Smith |
| 2007/0133354 | A1 | 6/2007 | Bagaini et al. |
| 2009/0251994 | A1 | 10/2009 | Rouquette |
| 2010/0118647 | A1 | 5/2010 | Tenghamn |
| 2010/0232260 | A1 | 9/2010 | Zowarka et al. |
| 2011/0038225 | A1 | 2/2011 | Tenghamn |
| 2011/0085416 | A1 | 4/2011 | Sallas |
| 2011/0085422 | A1 | 4/2011 | Thompson et al. |
| 2011/0128818 | A1 | 6/2011 | Eick et al. |
| 2011/0162906 | A1 | 7/2011 | Harper et al. |
| 2011/0317515 | A1 | 12/2011 | Tenghamn |
| 2012/0188845 | A1 | 7/2012 | Jeffryes |
| 2012/0314536 | A1 * | 12/2012 | Bagaini ............ 367/20 |
| 2013/0100764 | A1 * | 4/2013 | Ruet ............ 367/20 |

FOREIGN PATENT DOCUMENTS

| | | | |
|---|---|---|---|
| GB | 2259141 | A | 3/1993 |
| GB | 2 280 032 | A | 1/1995 |
| GB | 2 306 219 | A | 4/1997 |
| WO | 86/03015 | | 5/1986 |
| WO | 01/16621 | A1 | 3/2001 |
| WO | 2009/077762 | A2 | 6/2009 |
| WO | 2012/123883 | A2 | 9/2012 |
| WO | 2012170608 | A2 | 12/2012 |

OTHER PUBLICATIONS

Great Britain Search Report in corresponding Great Britain Application No. 1215276.5 dated Dec. 21, 2012.

Written Opinion of the International Searching Authority in corresponding International Application No. PCT/EP2012/067998 mailed Oct. 17, 2012.

International Search Report in corresponding International Application No. PCT/EP2012/067998 mailed Oct. 17, 2012.

William H. Dragoset, "Marine Vibrators and the Doppler Effect". Geophysics, vol. 53., No. 11, Nov. 1989, pp. 1388-1398.

Gary Hampson et al., "Effects of Source and Receiver Motion on Seismic Data", Geophysical Prospecting vol. 43, Issue 2, Feb. 1995, pp. 221-244.

J.E. Martin et al., Abstract of "Simultaneous Vibroseis Recording", Geophysical Prospecting, vol. 41, Apr. 1993.

Choon Byong Park et al., "Swept Impact Seismic Technique (SIST)", Geophysics, vol. 61, No. 6, Nov.-Dec. 1996, pp. 1789-1803.

William C. Pritchett, "An Example of Simultaneous Recording Where Necessary Signal Separation is Easily Achieved", Geophysics, vol. 56, No. 1, Jan. 1991 pp. 9-17.

E. Rietsch, "Vibroseis Signals With Prescribed Power Spectrum", Geophysical Prospecting, vol. 25, Issue 4, Dec. 1977, pp. 614-620.

Abd El-Aziz Khairy Abd El-Aal, "Harmonic by Harmonic Removal Technique for Improving Vibroseis Data Quality", Geophysical Prospecting, vol. 59, Issue 2, Mar. 2011, pp. 279-294.

E. Rietsch, "Computerized Analysis of Vibroseis Signal Similarity", Geophysical Prospecting, vol. 25, Issue 3, Sep. 1977, pp. 541-552.

Ulrich Polom, "Elimination of source-genrated noise from correlated vibroseis data (the 'ghost-seep' problem)", Geophysical Prospecting, vol. 45, Issue 4, Jul. 1997, pp. 571-591.

US Office Action mailed on Apr. 8, 2013, in related U.S. Appl. No. 13/677,661.

US Office Action mailed on Mar. 25, 2013, in related U.S. Appl. No. 13/677,713.

US Office Action mailed on May 9, 2013, in related U.S. Appl. No. 13/687,028.

US Office Action mailed on Apr. 15, 2013, in related U.S. Appl. No. 13/687,084.

Danish First Technical Examination mailed Jun. 4, 2013 with Search Report in related Application No. PA 2012 70503.

US Office Action mailed May 29, 2013, in related U.S. Appl. No. 13/415,216.

Danish First Technical Examination mailed Jun. 10, 2013 with Search Report in related Application No. PA 2012 70507.

US Office Action mailed Aug. 26, 2013, in related U.S. Appl. No. 13/677,713.

International Search Report in related International Application No. PCT/EP2012/067999, mailed Aug. 9, 2013 (All references cited in the ISR were previously provided to the USPTO in a prior IDS) (US 2009/0251994 issued as USP 7,881,160).

Written Opinion in related International Application No. PCT/EP2012/067999, mailed Aug. 9, 2013.

* cited by examiner

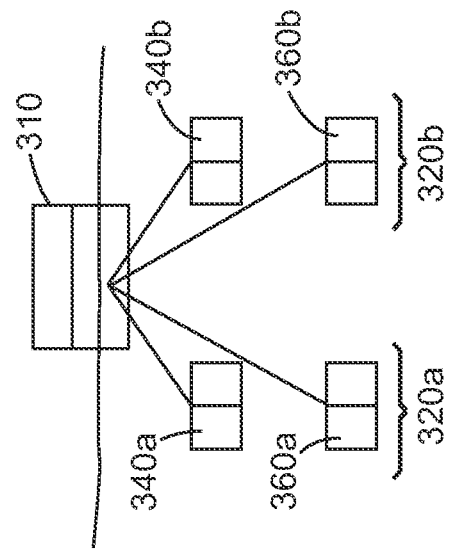
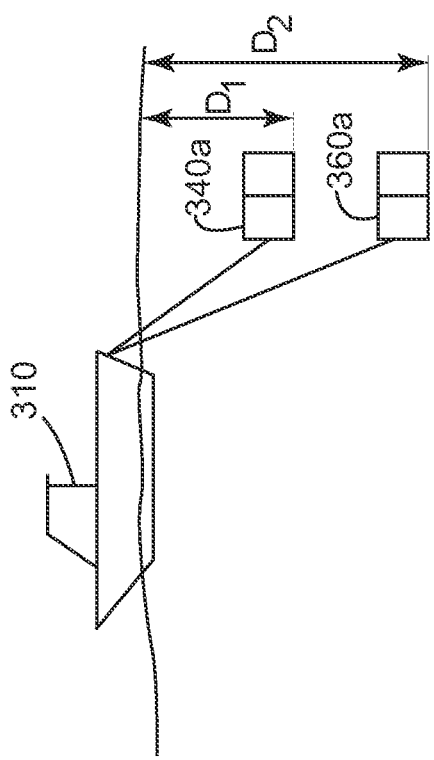
Figure 4B
300
Figure 4A
300

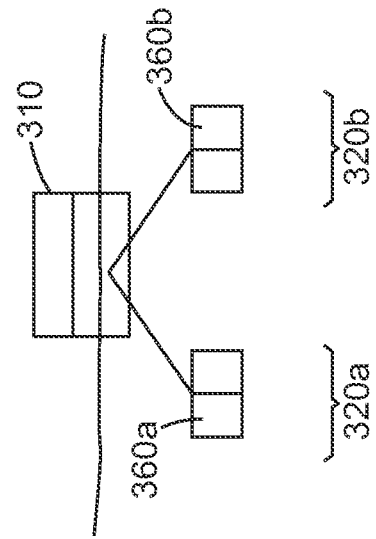
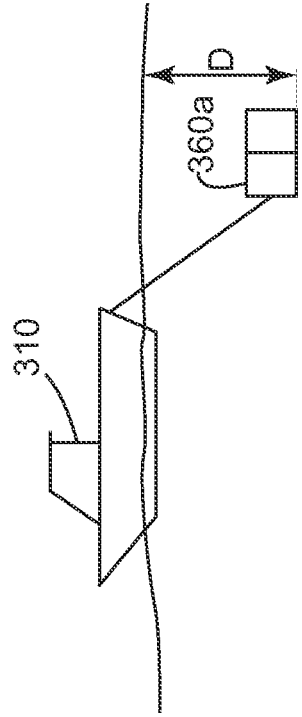

400

400

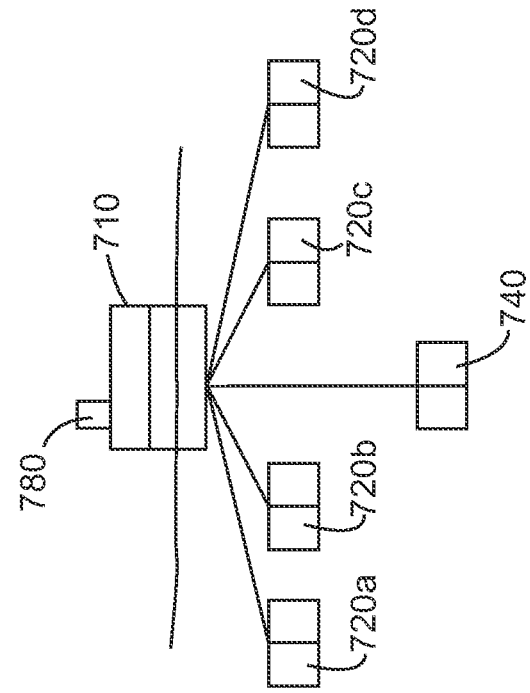
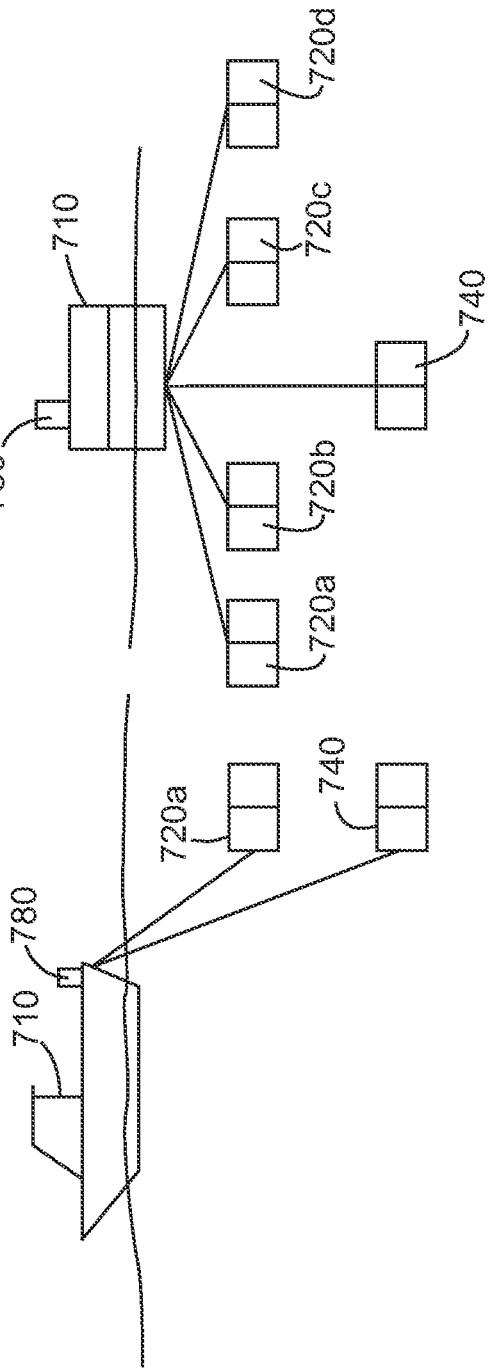
Figure 7A
Figure 7B

ACQUISITION SCHEME FOR VIBROSEIS MARINE SOURCES

BACKGROUND

1. Technical Field

Embodiments of the subject matter disclosed herein generally relate to methods and systems and, more particularly, to mechanisms and techniques for generating an acquisition scheme for vibroseis marine sources.

2. Discussion of the Background

Reflection seismology is a method of geophysical exploration to determine the properties of a portion of a subsurface layer in the earth, which information is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, seismic sources are essentially impulsive (e.g., compressed air is suddenly allowed to expand). One of the most used sources are airguns. The airguns produce a high amount of acoustics energy over a short time. Such a source is towed by a vessel either at the water surface or at a certain depth. The acoustic waves from the airguns propagate in all directions. A typical frequency range of the acoustic waves emitted by the impulsive sources is between 6 and 300 Hz. However, the frequency content of the impulsive sources is not fully controllable and different sources are selected depending on the needs of a particular survey. In addition, the use of impulsive sources can pose certain safety and environmental concerns.

Thus, another class of sources that may be used are vibratory sources. Vibratory sources, including hydraulically powered sources and sources employing piezoelectric or magnetostrictive material, have been used in marine operations. However, there is no large scale use of such sources as they have limited power and are not reliable due to the number of moving parts required to generate the seismic waves. A positive aspect of the vibratory sources is that they can generate signals over various frequency bands, commonly referred to as "frequency sweeps". The frequency band of such sources may be better controlled compared to impulsive sources. However, the known vibratory sources do not have a high vertical resolution as the typical frequency range of a marine seismic source represents approximately four octaves. A few examples of such sources are now discussed.

The vibratory sources need to be spatially arranged, when towed, so that they reasonably cover the subsurface desired to be investigated and also provide a high energy output so that the receivers are able to record the reflected seismic waves. Various arrangements are known in the art for impulsive sources that may also be used for the vibratory sources. For example, FIG. 1 shows a system 10 in which a source array 20 is towed underwater with plural streamers 30 (four in this case). The figure illustrates a cross-sectional view of this system, i.e., in a plane perpendicular to the streamers. The seismic waves 22a-d emitted by the source are reflected from a surface 40 and recorded by receivers of the streamers 30. A distance "a" between two successive reflections is called a bin size. Because this bin size is measured along a cross-line, "a" represents the cross-line bin size. The cross-line is defined as a line substantially perpendicular to the streamers, different from an axis Z that describes the depth of the streamers underwater. An inline is a line that extends substantially along the streamers and is perpendicular on the cross-line. For example, the Cartesian system shown in FIG. 1 has the X axis parallel to the inline, the Y axis parallel to the cross-line and the Z axis describes the depth of the streamers.

With this arrangement, the cross-line bin size is half the cross-line distance 42 between two consecutive streamers. It is noted that the streamers are typically placed 100 m from each other. The inline bin size may be much smaller as it depends mainly on the separation between the receivers in the streamer itself, which may be around 12 to 15 m. Thus, it is desired to decrease the cross-line bin size. With a cross-line bin size in the order of 50 m, aliasing effects may be produced, especially for the highest frequencies as the maximum bin size is inversely proportional to the frequency.

A common technique for reducing the cross-line bin size is the flip-flop acquisition scheme. In this mode, the vessel tows two sources 20 and 20' as shown in FIG. 2. This arrangement 50 is configured to shoot one source 20, listen for a predetermined time for the reflections of the first emitted wave, and then to shoot the other source 20' and listen for the reflections of the second emitted wave. Then, the process is repeated. This scheme doubles the coverage and reduces the cross-line bin size to a distance "b", which is smaller than "a".

However, due to the particulars of the vibro-acoustic sources, there are additional acquisition schemes, not applicable to impulsive sources, that can be used to increase the performances of the acquisition as discussed next.

SUMMARY

According to one exemplary embodiment, there is an incoherent acquisition method for driving vibrational source arrays under water. The method includes a step of towing with a vessel a first source array and a second source array underwater, wherein the first source array includes plural first individual source elements and the second source array includes plural first individual source elements; and a step of activating simultaneously the first source array and the second source array so that incoherent coded driving signals drive the first and second source arrays.

According to still another exemplary embodiment, there is a control mechanism configured to implement an incoherent acquisition method for driving vibrational source arrays under water. The control mechanism includes a processor configured to activate simultaneously a first source array and a second source array so that incoherent coded driving signals drive the first and second source arrays. The first source array includes plural first individual source elements and the second source array includes plural first individual source elements.

According to yet another exemplary embodiment, there is a coherent acquisition method for driving vibrational source arrays under water. The method includes a step of towing with a vessel high-frequency first and second source arrays and a low-frequency source array underwater, wherein the high-frequency first and second source arrays include plural high-frequency individual source elements and the low-frequency source array includes plural low-frequency individual source elements; a step of activating simultaneously the high-frequency first source array and the high-frequency second source array so that incoherent coded driving signals drive the high-frequency first and second source arrays; and a step of activating simultaneously the plural low-frequency individual source elements of the low-frequency source array so that coherent coded driving signals drive the low-frequency individual source elements.

According to still another exemplary embodiment, there is a control mechanism configured to implement a coherent acquisition method for driving vibrational source arrays under water. The control mechanism includes a processor configured to, activate simultaneously a high-frequency first source array and a high-frequency second source array so that incoherent coded driving signals drive the high-frequency first and second source arrays; and activate simultaneously plural low-frequency individual source elements of a low-frequency source array so that coherent coded driving signals drive the low-frequency individual source elements. The first and second source arrays include plural high-frequency individual source elements.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4a to 4d are schematic diagrams of an incoherent acquisition scheme according to an exemplary embodiment;

FIGS. 7a and 7b illustrate another coherent acquisition scheme according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibroseis acoustic source array. However, the embodiments to be discussed next are not limited to this structure, but may be applied to other arrays or sources that generate a seismic wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there are at least two source arrays, each array having two or more individual source elements. The source arrays are operated (i) simultaneously and incoherently with coded driving signals or (ii) simultaneously and coherently. By operating the source arrays simultaneously and incoherently, a total energy output is doubled relative to a conventional source array using a flip-flop acquisition scheme. By operating the source arrays simultaneously and coherently, a total energy output quadruples relative to a conventional source array using a flip-flop acquisition scheme. In one application, each source array is made up of two sub-arrays. A first sub-array may include individual source elements optimized for a first frequency range (e.g., low-frequency range, between 2 and 32 Hz) and a second sub-array may include individual source elements optimized for a second frequency range (e.g., high-frequency range, between 32 and 128 Hz). A larger number of sub-arrays or different frequencies are also possible.

Figure 1:
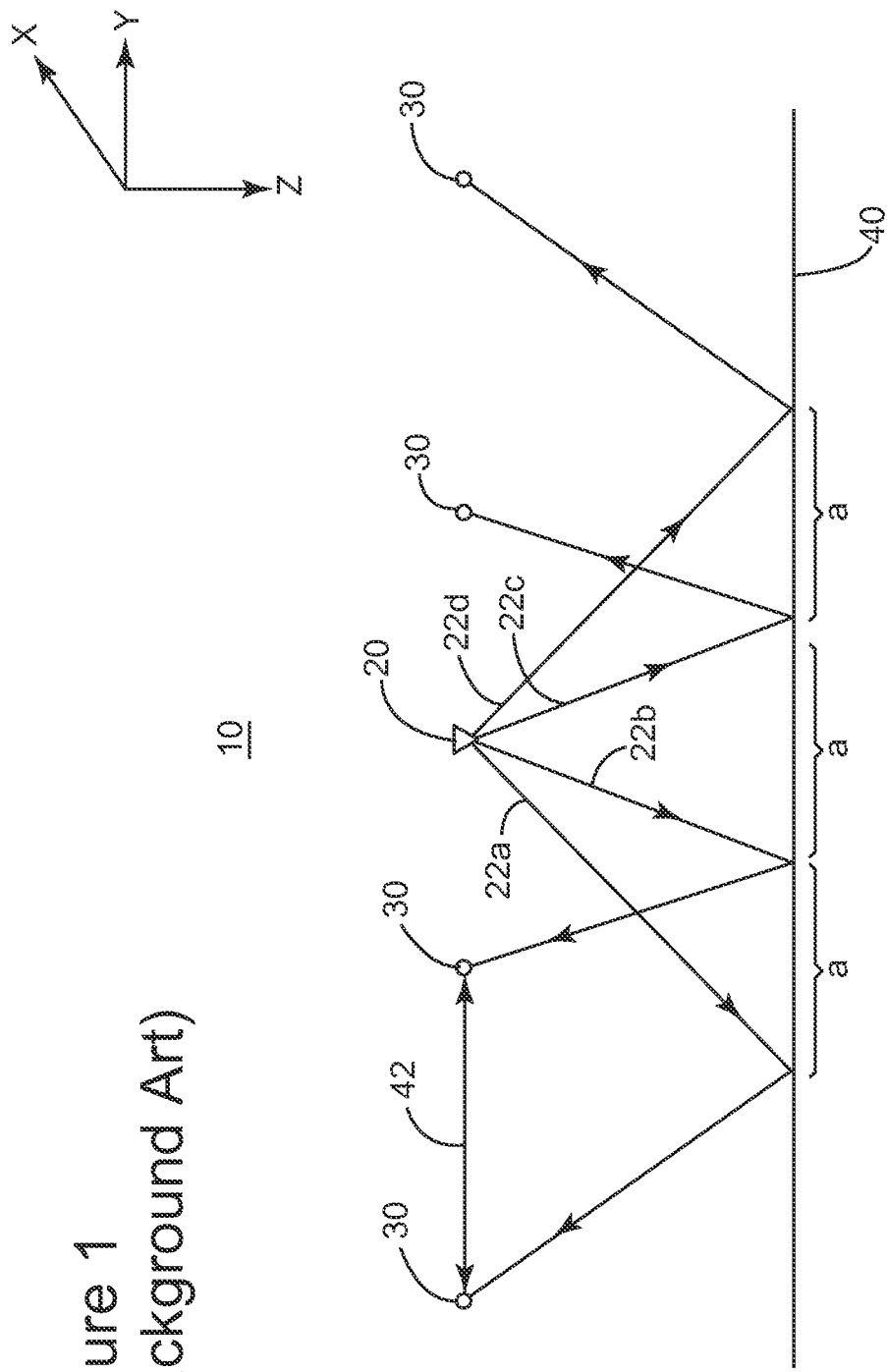
FIG. 1 is a schematic diagram of a traditional acquisition scheme.
Figure 2:
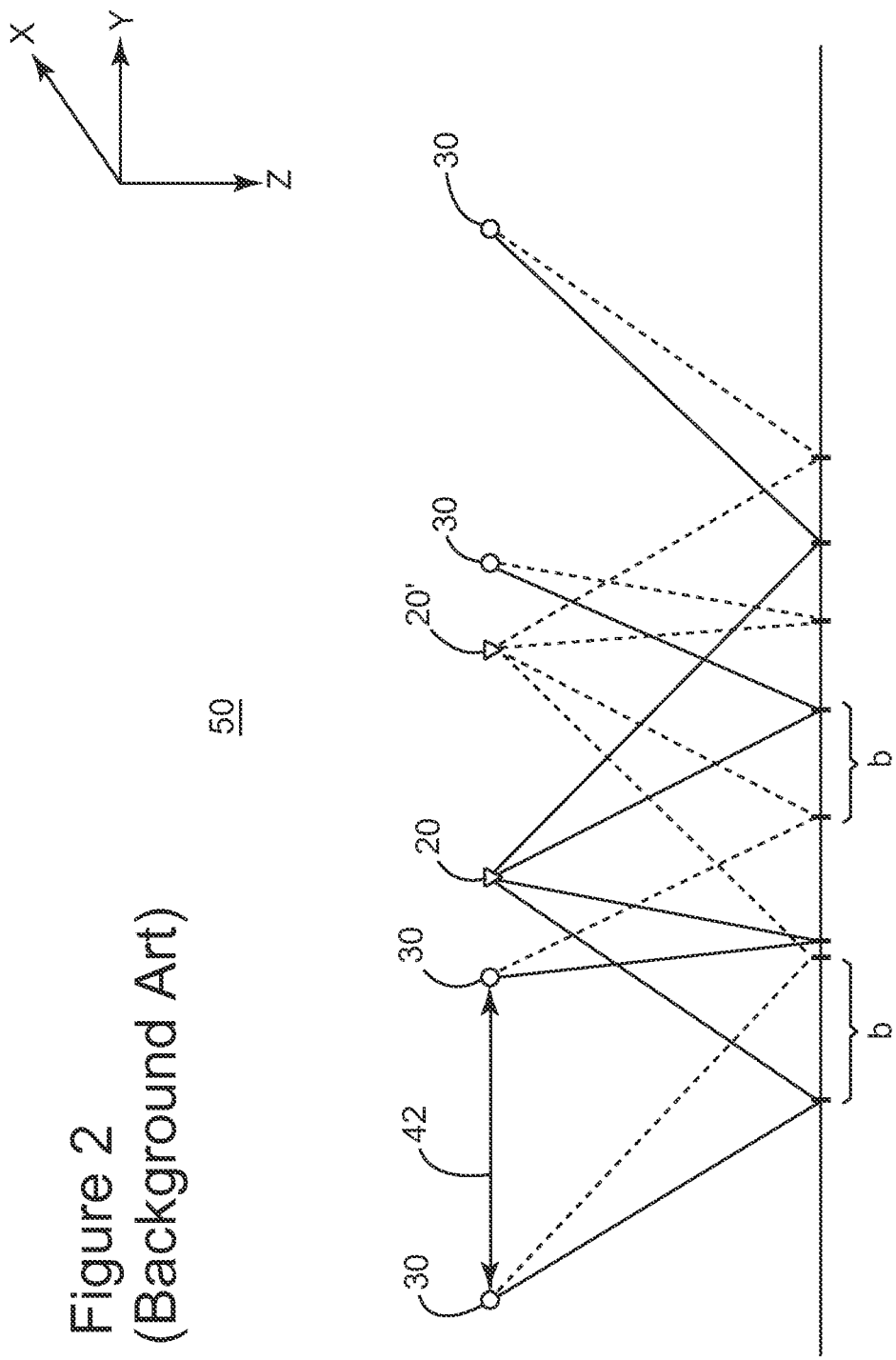
FIG. 2 is a schematic diagram of a flip-flop acquisition scheme.
Figure 3:
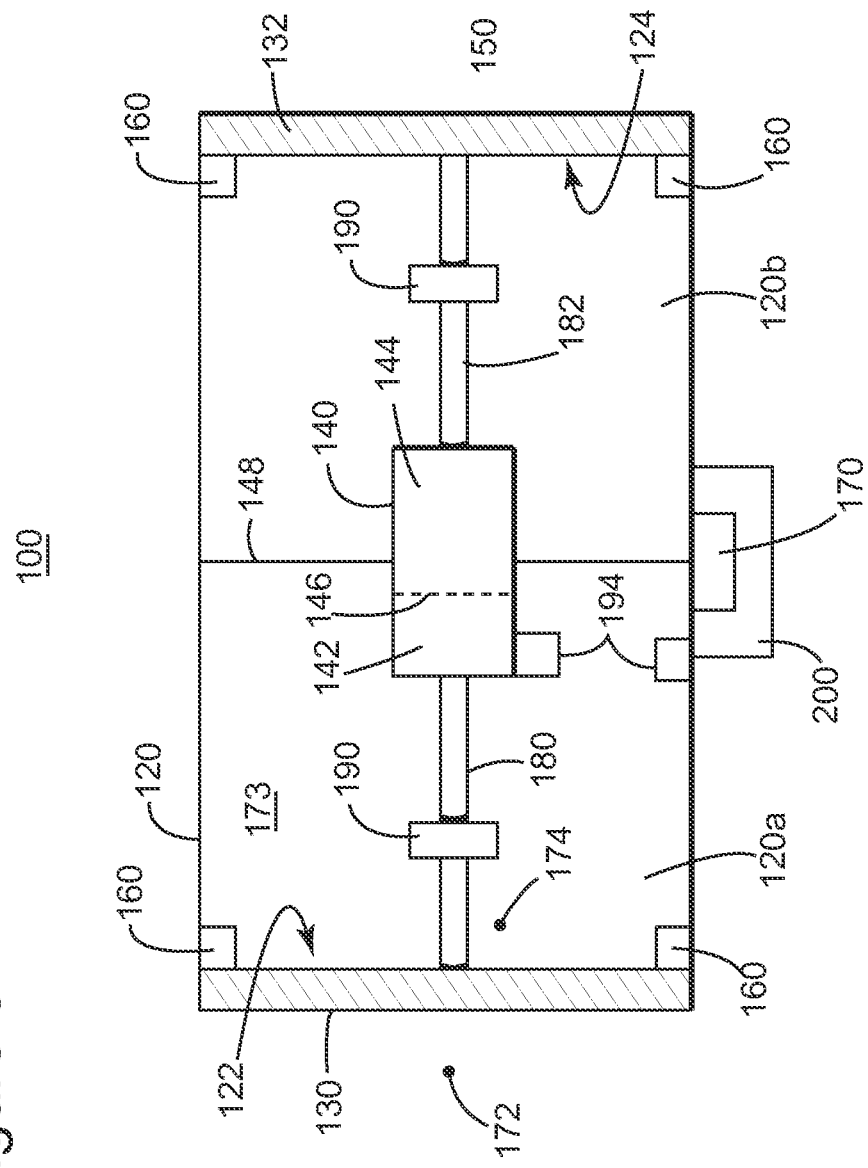
FIG. 3 is a schematic diagram of vibro-acoustic source element.

Before discussing a novel acquisition scheme, an example of a source element is now discussed. It is noted that this one possible source element and the novel acquisition scheme may be applied to different source elements (e.g., any vibro-acoustic source element). According to an exemplary embodiment, an individual source element is illustrated in FIG. 3. FIG. 3 shows the individual source element 100 of a seismic source array including an enclosure 120 that together with pistons 130 and 132 enclose an electro-magnetic actuator system 140 and separate it from the ambient 150, which might be water. The enclosure 120 has first and second openings 122 and 124 that are configured to be closed by the pistons 130 and 132. The electro-magnetic actuator system 140 is configured to simultaneously drive the pistons 130 and 132 in opposite directions for generating the seismic waves. In one application, the pistons 130 and 132 are rigid. The electro-magnetic actuator system 140 may include two or more individual electro-magnetic actuators 142 and 144. Irrespective of how many individual electro-magnetic actuators are used in a individual source element 100, the actuators are provided in pairs and the pairs are configured to act simultaneously in opposite directions on corresponding pistons in order to prevent a "rocking" motion of the individual source element 100.

The size and configuration of the electro-magnetic actuators depend on the acoustic output of the individual source element. FIG. 3 shows that the two actuators 142 and 144 are separated by a wall 146, which does not have to be at the middle of the actuator system 140. Further, in one embodiment, the two actuators 142 and 144 are formed as a single unit and there is no interface between the two actuators. In still another application, the two actuators 142 and 144. In yet another application, the actuator system 140 is attached to the enclosure 120 by an attachment 148. The attachment 148 may be a strut-type structure. In one application, the attachment 148 may be a wall that splits the enclosure 120 in a first chamber 120a and a second chamber 120b. If the attachment 148 is a wall, the actuators 142 and 144 may be attached to the wall 148 or may be attached to the enclosure 120 by other means in such a way that the actuators 142 and 144 do not contact the wall 148.

In order to provide the pistons 130 and 132 with the ability to move relative to the enclosure 120 in order to generate the seismic waves, a sealing mechanism 160 is provided between the pistons and the enclosure. The sealing mechanism 160 may be configured to slide back and forth with the pistons. The sealing mechanism 160 may be made of an elastomeric material, or may be a metallic flexible structure. In another application, the sealing mechanism 160 may be a gas or liquid seal. A gas seal (air bearing seal) is configured to inject a gas at the interface between the enclosure and the pistons to prevent the ambient water from entering the enclosure. A liquid seal may use, e.g., a ferromagnetic fluid, at the interface between the enclosure and the pistons to prevent the ambient water from entering the enclosure. Other seals may be used as will be recognized by those skilled in the art.

The embodiment shown in FIG. 3 may also include a pneumatic regulation mechanism 170. The pneumatic regulation mechanism 170 may be used to balance the external pressure of the ambient 150 with a pressure of the medium enclosed by the enclosure 120 to reduce a work load of the actuator system 140. It is noted that if a pressure of the ambient at point 172 (in front of the piston 130) is substantially equal to a pressure of the enclosed medium 173 of the enclosure 120 at point 174, the work load of the actuator system 140 may be used entirely to activate the piston to generate the acoustic wave instead of a portion thereof used to overcome the ambient pressure at point 172. The enclosed medium 173 of the enclosure 120 may be air or other gases or mixtures of gases.

The pneumatic mechanism 170 may be fluidly connected to a pressure source (not shown) on the vessel towing the individual source element 100. The pneumatic mechanism 170 may also be configured to provide an additional force on the pistons 130 and 132, e.g., at lower frequencies, to increase an acoustic output of the individual source element and also to extend a frequency spectrum of the individual source element.

The embodiment illustrated in FIG. 3 may use a single shaft (180 and 182) per piston to transmit the actuation motion from the actuation system 140 to the pistons 130 and 132. However, more than one shaft per piston may be used depending on the requirements of the individual source element. To provide a smooth motion of the shaft 180 relative to the enclosure 120 (e.g., to prevent a wobbling motion of the shaft), a guiding system 190 may be provided.

In one application, heat is generated by the actuation system 140. This heat may affect the motion of the shafts and/or the functioning of the actuator system. For this reason, a cooling system 194 may be provided at the individual source element. The cooling system 194, as will be discussed later, may be configured to transfer heat from the actuator system 140 to the ambient 150.

The pistons 130 and 132 are desired to generate an output having a predetermined frequency spectrum. To control this output, a local control system 200 may be provided, inside, outside or both relative to the enclosure 120. The local control system 200 may be configured to act in real-time to correct the output of the individual source element 100. As such, the local control system 200 may include one or more processors and sensors that monitor the status of the individual source element 100 and provide commands for the actuator system 140 and/or the pneumatic mechanism 170.

The source arrays discussed above may be made up entirely of the individual source element illustrated in FIG. 3. However, the source arrays may be made up of different vibroseis source elements or a combination of those shown in FIG. 3 and those known in the art.

According to an exemplary embodiment, an incoherent acquisition scheme is now discussed. This acquisition scheme is exemplified with reference to FIGS. 4a and 4b, which show, from side and back, an acquisition system 300 including a vessel 310 and two source arrays 320a and 320b. Each source array 320a and 320b may include a first sub-array 340a and 340b, respectively, and a second sub-array 360a and 360b, respectively. However, it is noted that it is possible to have a source array 320a that includes only the sub-array 340a or only the sub-array 360b and the same is true for the source array 320b.

FIGS. 4a and 4b show each source array having two sub-arrays as the quality of the subsurface's image is better when having two sub-arrays. For example, the sub-arrays 340a and 340b may include high-frequency individual source elements and the sub-arrays 360a and 360b may include low-frequency individual source elements. The high-frequency individual source elements are towed at a first depth D1 while the low-frequency individual source elements are towed at a second depth D2, larger than D1.

As coded driving signals are applied to the vibrating individual source elements for emitting the seismic waves (acoustic waves for example), the individual source elements may be driven simultaneously and in an incoherent way. A driving signal may include but is not limited to a random noise, a frequency sweep, etc. A coded driving signal has a signature that can be recovered later, i.e., when the seismic wave are recorded, during a processing stage, the recorded waves may be separated based on the sources that emitted those waves. Driving the sources incoherently means that coded driving signals for source array 320a do not overlap (are not correlated) with coded driving signals for source array 320b. For these reasons, the recorded seismic waves (after reflection on the subsurface) can be recovered and separated during processing, for example, by using signature deconvolution or cross-correlation with a pilot. This is not possible for the airgun sources.

By driving the source arrays 320a and 320b simultaneously and incoherently with coded driving signals, the total energy emitted by the two source arrays is doubled (total energy output +3 dB) relative to the case that the sources are using a flip-flop acquisition scheme. A flip-flop acquisition scheme drives sources in a given pattern. For example, considering that it is possible to drive a source in modes A and B, by driving the source ABAB . . . or ABBABB . . . it is achieved a flip-flop acquisition scheme. It is noted that a source array may include a predetermined number of individual source elements, e.g., between 16 and 30. Other numbers of individual source elements are also possible. The term "simultaneously" indicates that all individual source elements of both the source array 320a and the source array 320b are driven at the same time. However, the term "incoherently" means that the individual source elements of the source array 320a have a content different from the individual source elements of the source array 320b. In other words, the individual source elements of the source array 320a all emit the same content and the individual source elements of the source array 320b all emit a different content and thus, any pair of sources, one from the source array 320a and one from the source array 320b have a different content.

In another exemplary embodiment, it is possible to drive simultaneously and incoherently only the sub-arrays 340a and 340b or only the sub-arrays 360a and 360b. In still another exemplary embodiment which is illustrated in FIGS. 4c and 4d, it is possible to have the source arrays 320a and 320b having all the source elements 360a and 360b, respectively, provided at the same depth D. Thus, according to this exemplary embodiment, the individual source elements are not separated based on a frequency content as in FIGS. 4a and 4b. For the exemplary embodiment shown in FIGS. 4c and 4d, the same novel acquisition scheme as discussed for FIGS. 4a and 4b is applicable.

Figure 5B:
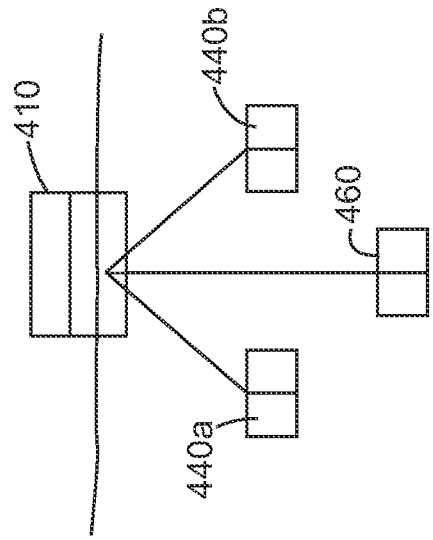
FIGS. 5a and 5b are schematic diagrams of a coherent acquisition scheme according to an exemplary embodiment.
Figure 5A:
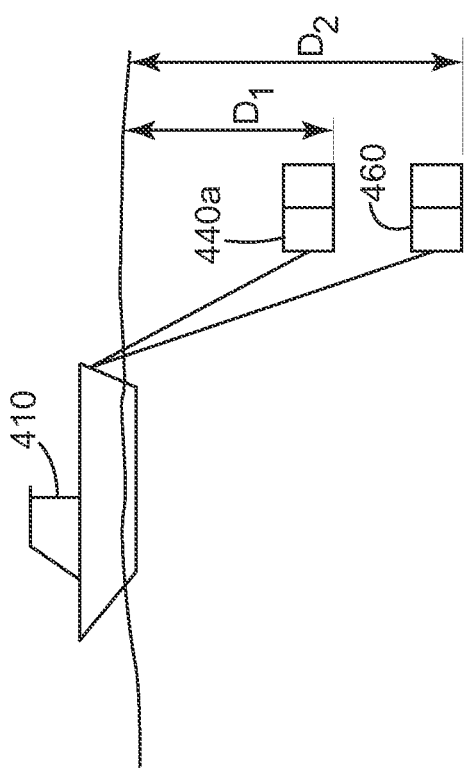

According to another exemplary embodiment a coherent acquisition scheme is now discussed. This acquisition scheme is exemplified with reference to FIGS. 5a and 5b, which show, from side and back, respectively, an acquisition system 400 including a vessel 410 and three source arrays 440a and 440b and 460. In this embodiment, each of the source arrays 440a and 440b includes one sub-array having high-frequency individual source elements and the source array 460 includes low-frequency individual source elements. In other words, comparing the embodiment of FIG. 5b with that of FIG. 4b, the low-frequency individual source elements 360a and 360b have been merged in a single source arrangement 460. The high-frequency individual source elements are towed at a first depth D1 while the low-frequency individual source elements are towed at a second depth D2, larger than D1.

As the vibrating individual source elements use coded driving signals for emitting the seismic waves (acoustic waves for example), the high-frequency individual source elements may be driven simultaneously and in an incoherent way while the low-frequency individual source elements may be driven simultaneously and in a coherent way. That means that a content of the signals from source array 440a does not overlap with a content of the signals from source array 440b. For these reasons, the recorded seismic waves for the high-frequency spectrum (after reflection on the subsurface) can be recovered and separated during processing, for example, by using signature deconvolution or cross-correlation with a pilot. However, that is not the case now for the low-frequency spectrum as these individual source elements are driven by coherent driving signals.

This specific arrangement for the low and high-frequency individual source elements is made because the high-frequency spectrum is desired for accurately determining relative positions of the various layers and/or interfaces in the subsurface while the low-frequency spectrum does not affect the clarity of these features but provide the general background trend. Also, the maximum bin size to prevent aliasing depends on the frequency and the high frequencies sources need to be kept separated for this reason.

By driving the source arrays 440a and 440b simultaneously and incoherently with coded driving signals, the energy emitted by the two source arrays is doubled (total energy output +3 dB) relative to the case that the sources are using a flip-flop acquisition scheme. Further, by driving the individual source elements of the source array 460 simultaneously and coherently, the energy emitted by the low-frequency individual source elements quadruple (total energy output +6 dB) at a cost of a bigger bin size, which is acceptable for the low-frequencies because they can be interpolated.

Figure 6:
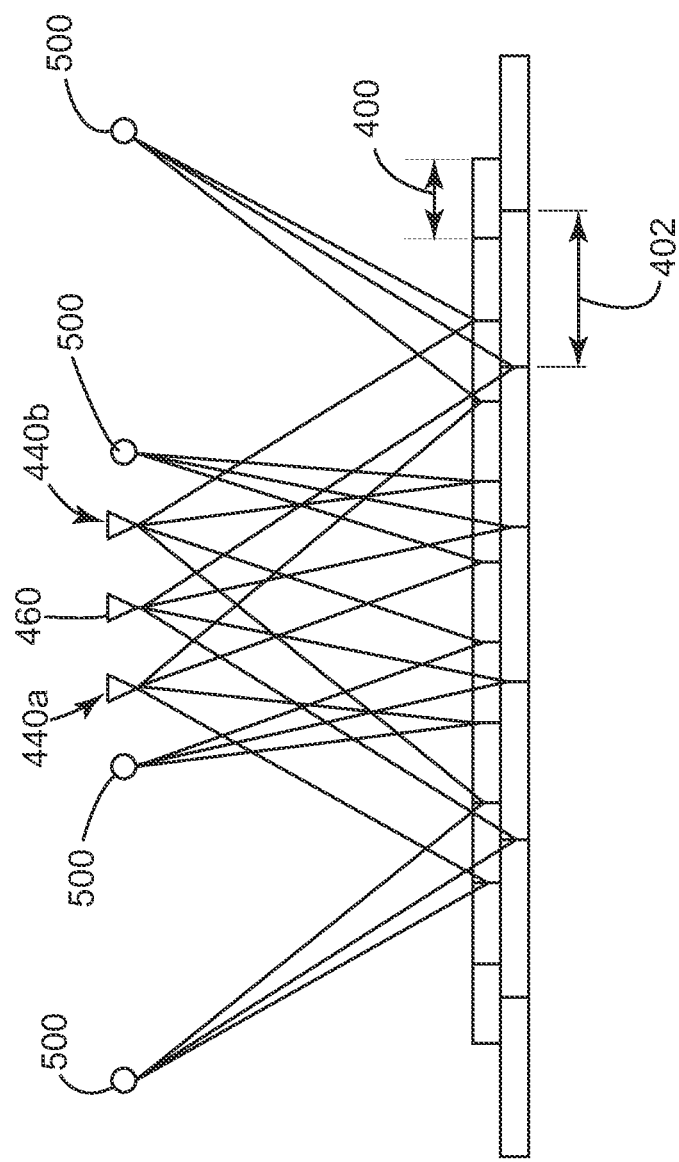
FIG. 6 is a schematic illustration of a bin size when coherently driving low-frequency individual source elements and incoherently driving high-frequency individual source elements.

As shown in FIG. 6, two high-frequency source arrays 440a and 440b and a low-frequency source array 460 are provided underwater. FIG. 6 also shows streamers 500 and how seismic waves emitted by the source arrays reflect from the subsurface. A bin size 400 for the high-frequency source arrays 440a and 440b is small (but has double energy) and a bin size 402 for the low-frequency source array 460 is larger (but has quadruple energy). The data from the low frequencies and high-frequency recordings can be then interpolated to common points and merged together.

In another exemplary embodiment, it is possible to drive simultaneously and coherently the source arrays 440a and 440b in addition to the source array 460. In still another exemplary embodiment illustrated in FIGS. 7a and 7b, it is possible to have more than two source arrays 720a to 720d for the high-frequency individual source elements and a single source array 740 for the low-frequency individual source elements. In another application, the number of high-frequency individual source elements may be larger than four. Further, it is possible to have one or more layers of individual source elements provided between the high-frequency and the low-frequency source elements. In other words, the method is applicable not only to individual source elements split as shown in FIG. 7b but also to source arrays that have the individual source elements provided at various depths and emitting the same or different frequencies. Similar to the embodiment shown in FIGS. 5a and 5b, the source arrays 720a to d may use the incoherent acquisition scheme while the source array 740 may use the coherent acquisition scheme.

Figure 11:
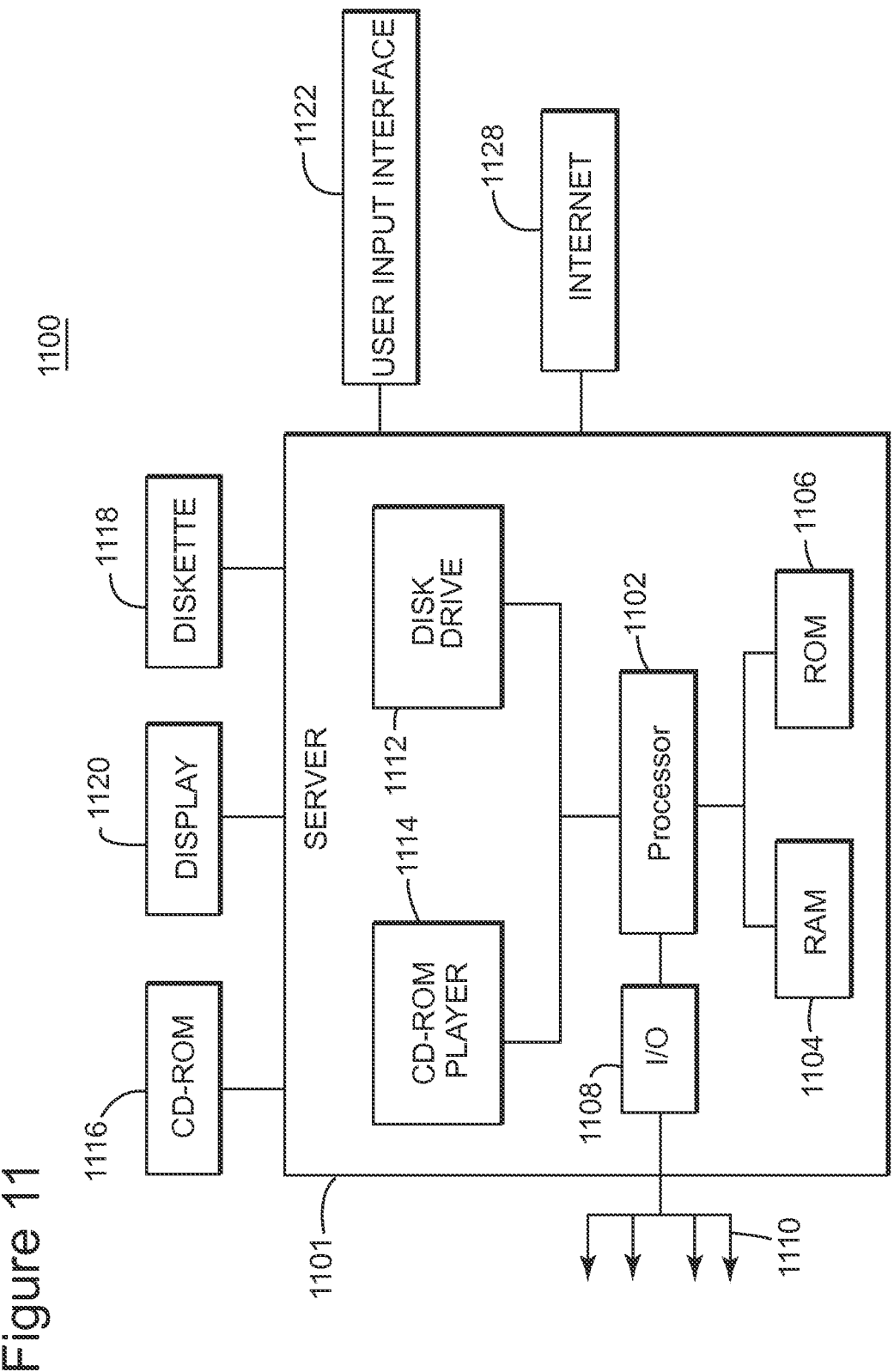
FIG. 11 is a schematic diagram of a controller according to an exemplary embodiment.

The incoherent and coherent acquisition schemes discussed above may be implemented in a control mechanism illustrated, for example, in FIG. 11, which is discussed later. The control mechanism 780 may be provided on the vessel 710 as shown in FIG. 7, or may be provided as element 200 on the individual source element as shown in FIG. 3, or may be distributed at the vessel and at the source arrays. Optionally, the control mechanism may be configured not only to activate the coherent or incoherent acquisition schemes but also to control individual source elements, e.g., to control the activation of an electro-magnetic actuator system (140) of a low-frequency individual source element to generate a first seismic wave and/or to activate a pneumatic mechanism (170) of a low-frequency individual source element to generate a second seismic wave.

Figure 8B:
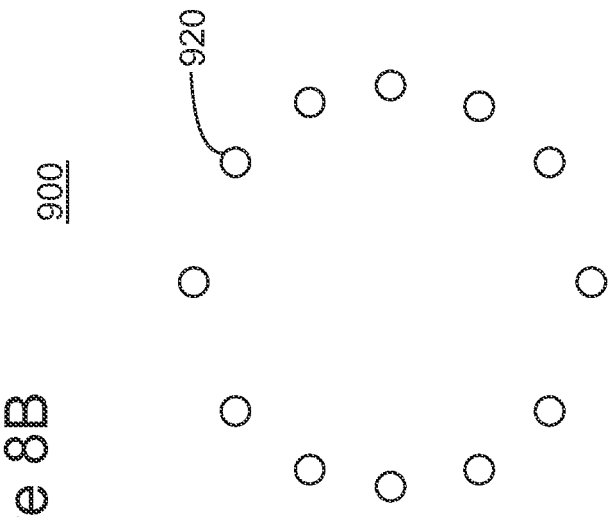
FIGS. 8a and 8b illustrate various arrangements of individual source elements in a source array.
Figure 8A:
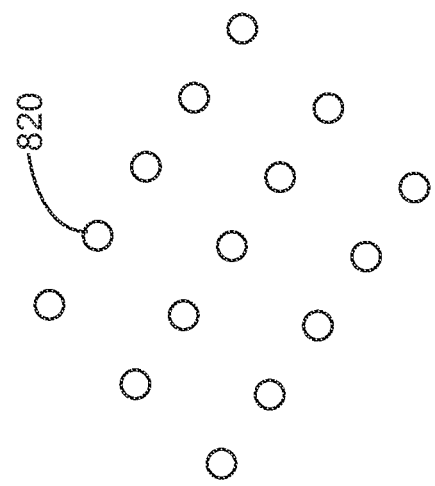

Any of the source arrays discussed above may include plural individual source elements. In this respect, FIG. 8a shows a linear arrangement 800 that includes plural individual source elements 820 and FIG. 8b shows a circular arrangement 900 that includes plural individual source elements 920. Other arrangements are also possible. The individual source elements 820 and/or 920 may be the source element 100 shown in FIG. 3. Other type of individual source elements may be used. The source arrays 800 or 900 may correspond to any of the source arrays 320a, 320b, 440a, 440b, and 460.

Figure 9:
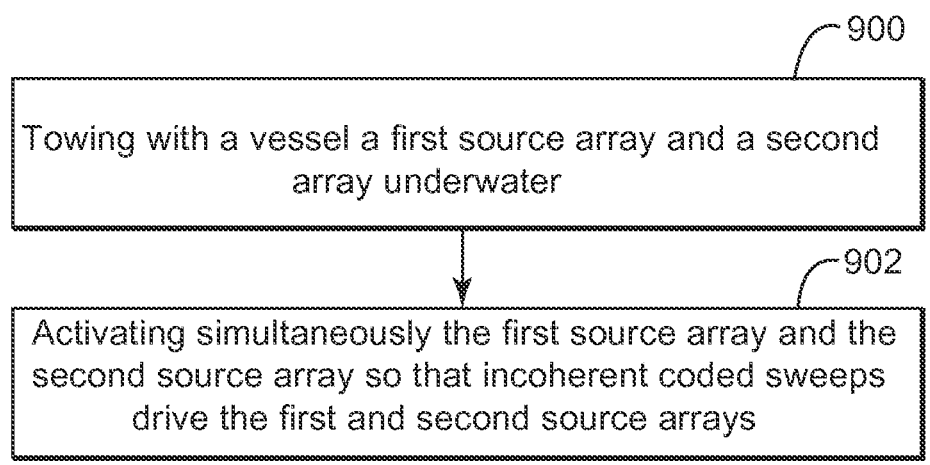
FIG. 9 is a flow chart of an incoherent acquisition scheme according to an exemplary embodiment.

The acquisition schemes previously discussed may be implemented by the following methods. According to an exemplary embodiment illustrated in FIG. 9, there is an incoherent acquisition method for driving vibrational source arrays under water. The method includes a step 900 of towing with a vessel (310) a first source array (320a) and a second source array (320b) underwater, where the first source array (320a) includes plural first individual source elements (360a) and the second source array (320b) includes plural first individual source elements (360b); and a step 902 of activating simultaneously the first source array (320a) and the second source array (320b) so that incoherent coded driving signals drive the first and second source arrays.

Figure 10:
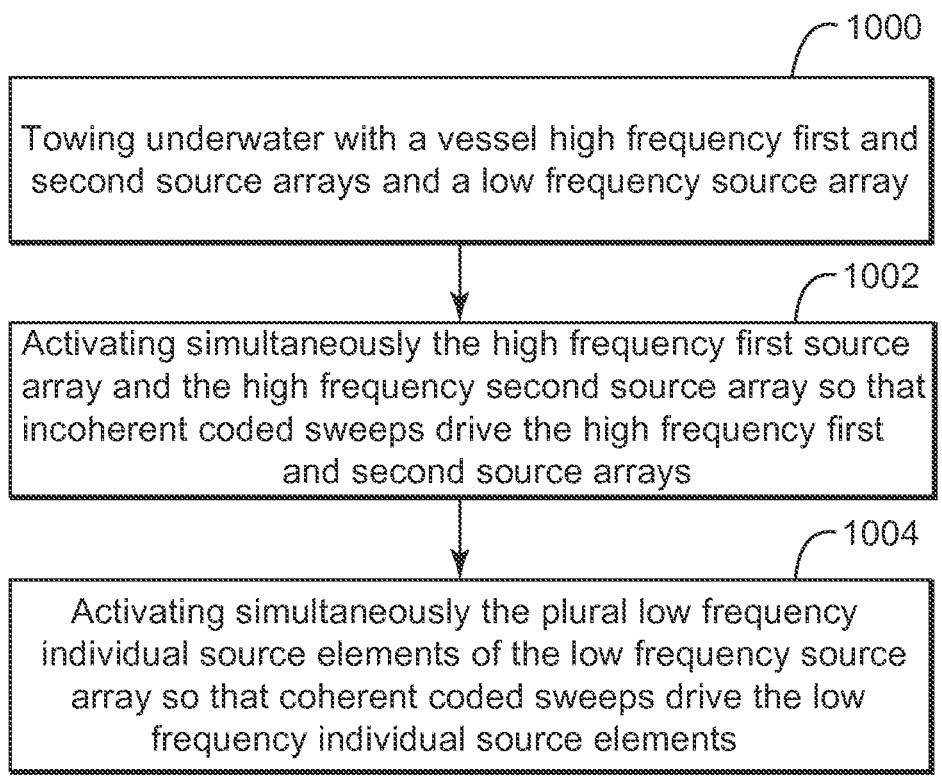
FIG. 10 is a flow chart of a coherent acquisition scheme according to an exemplary embodiment.

According to another exemplary embodiment illustrated in FIG. 10, there is a coherent acquisition method for driving vibrational source arrays under water. The method includes a step 1000 of towing with a vessel (410) high-frequency first and second source arrays (440a, 440b) and a low-frequency source array (460) underwater, where the first and second source arrays (440a, 440b) include plural high-frequency individual source elements and the low-frequency source array (460) includes plural low-frequency individual source elements; a step 1002 of activating simultaneously the high-frequency first source array (440a) and the high-frequency second source array (440b) so that incoherent coded driving signals drive the high-frequency first and second source arrays; and a step 1004 of activating simultaneously the plural low-frequency individual source elements of the low-frequency source array (460) so that coherent coded driving signals drive the low-frequency individual source elements.

An example of a representative control system capable of carrying out operations in accordance with the exemplary embodiments discussed above is illustrated in FIG. 11. Hardware, firmware, software or a combination thereof may be used to perform the various steps and operations described herein. The control system 1100 of FIG. 11 is an exemplary computing structure that may be used in connection with such a system.

The exemplary control system 1100 suitable for performing the activities described in the exemplary embodiments may include server 1101. Such a server 1101 may include a central processor unit (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. For example, the processor 1102 may communicate with the sensors, electro-magnetic actuator system and/or the pneumatic mechanism. The processor 1102 carries out a variety of functions as is known in the art, as dictated by software and/or firmware instructions.

The server 1101 may also include one or more data storage devices, including hard and floppy disk drives 1112, CD-ROM drives 1114, and other hardware capable of reading and/or storing information such as a DVD, etc. In one embodiment, software for carrying out the above discussed steps may be stored and distributed on a CD-ROM 1116, diskette 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD displays, plasma displays, cathode ray tubes (CRT), etc. A user input interface 1122 is provided, including one or more user interface mechanisms such as a mouse, keyboard, microphone, touch pad, touch screen, voice-recognition system, etc.

The server 1101 may be coupled to other computing devices, such as the equipment of a vessel, via a network. The server may be part of a larger network configuration as in a global area network (GAN) such as the Internet 1128, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The disclosed exemplary embodiments provide a source array, computer software, and method for generating acquisition schemes for under water vibrational sources. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An incoherent acquisition method for driving vibrational source arrays under water, the method comprising:
   towing with a vessel a first source array and a second source array underwater, wherein the first source array includes plural first low-frequency individual source elements and plural first high-frequency individual source elements and the second source array includes plural second low-frequency individual source elements and plural second high-frequency individual source elements; and
   activating simultaneously the plural first low-frequency and high-frequency individual source elements of the first source array and the plural second low-frequency and high-frequency individual source elements of the second source array so that incoherent coded driving signals drive the first and second source arrays.

2. The method of claim 1, wherein the incoherent coded driving signals of the first and second source arrays include multiple frequencies.

3. The method of claim 1, wherein the plural first low-frequency individual source elements and the plural second low-frequency individual source elements are configured to emit a frequency lower than about 32 Hz.

4. The method of claim 3, wherein the plural first high-frequency individual source elements and the plural second high-frequency individual source elements are configured to emit a frequency higher than about 32 Hz.

5. The method of claim 4, further comprising:
   towing the plural first and second low-frequency individual source elements at a depth larger than a depth of the plural first and second high-frequency individual source elements, respectively.

6. The method of claim 1, wherein the plural individual source elements are electro-mechanical sources.

7. The method of claim 6, further comprising:
   activating an electro-magnetic actuator system to generate a first seismic wave; and
   activating a pneumatic mechanism to generate a second seismic wave,
   wherein the electro-magnetic actuator system and the pneumatic mechanism are part of an individual source element.

8. A control mechanism configured to implement an incoherent acquisition method for driving vibrational source arrays under water, the control mechanism comprising:
  a processor configured to activate simultaneously a first source array and a second source array so that incoherent coded driving signals drive the first and second source arrays,
  wherein the first source array includes plural first low-frequency individual source elements and first high-frequency individual source elements and the second source array includes plural second low-frequency individual source elements and plural second high-frequency individual source elements.

9. The control mechanism of claim 8, wherein the incoherent coded driving signals of the first and second source arrays include multiple frequencies.

10. The control mechanism of claim 8, wherein the plural first low-frequency individual source elements and the plural second low-frequency individual source elements are configured to emit a frequency lower than about 32 Hz and the plural first high-frequency individual source elements and the plural second high-frequency individual source elements are configured to emit a frequency higher than about 32 Hz.

11. The control mechanism of claim 8, wherein the control mechanism is further configured to,
  activate an electro-magnetic actuator system to generate a first seismic wave; and
  activating a pneumatic mechanism to generate a second seismic wave,
  wherein the electro-magnetic actuator system and the pneumatic mechanism are part of an individual source element.

12. A coherent acquisition method for driving vibrational source arrays under water, the method comprising:
  towing with a vessel high-frequency first and second source arrays and a low-frequency source array underwater, wherein the high-frequency first and second source arrays include plural high-frequency individual source elements and the low-frequency source array includes plural low-frequency individual source elements;
  activating simultaneously the high-frequency first source array and the high-frequency second source array so that incoherent coded driving signals drive the high-frequency first and second source arrays; and
  activating simultaneously the plural low-frequency individual source elements of the low-frequency source array so that coherent coded driving signals drive the low-frequency individual source elements.

13. The method of claim 12, wherein the incoherent coded driving signals of the high-frequency first and second source arrays determine that a signal emitted by the high-frequency first source array is not correlated to a signal emitted by the high-frequency second source array while signals emitted by the low-frequency source array are correlated.

14. The method of claim 12, wherein the plural high-frequency individual source elements are configured to emit a frequency higher than about 32 Hz.

15. The method of claim 14, wherein the low-frequency individual source elements are configured to emit a frequency lower than about 32 Hz.

16. The method of claim 12, wherein the high-frequency and low-frequency plural individual source elements are electro-mechanical sources.

17. The method of claim 16, further comprising:
  activating an electro-magnetic actuator system of a low-frequency individual source element to generate a first seismic wave; and
  activating a pneumatic mechanism of a low-frequency individual source element to generate a second seismic wave.

18. A control mechanism configured to implement a coherent acquisition method for driving vibrational source arrays under water, the control mechanism comprising:
  a processor configured to,
  activate simultaneously a high-frequency first source array and a high-frequency second source array so that incoherent coded driving signals drive the high-frequency first and second source arrays; and
  activate simultaneously plural low-frequency individual source elements of a low-frequency source array so that coherent coded driving signals drive the low-frequency individual source elements,
  wherein the first and second source arrays include plural high-frequency individual source elements.

19. The control mechanism of claim 18, wherein the incoherent coded driving signals of the high-frequency first and second source arrays determine that a signal emitted by the high-frequency first source array is not correlated to a signal emitted by the high-frequency second source array while signals emitted by the low-frequency source array are correlated.

20. The control mechanism of claim 18, wherein the processor is configured to,
  activating an electro-magnetic actuator system of a low-frequency individual source element to generate a first seismic wave; and
  activating a pneumatic mechanism of a low-frequency individual source element to generate a second seismic wave.

* * * * *